(12) United States Patent
Sano

(10) Patent No.: US 7,352,398 B2
(45) Date of Patent: Apr. 1, 2008

(54) IMAGE PICK-UP APPARATUS AND METHOD FOR PICKING UP AND SYNTHESIZING PLURAL IMAGES TO GENERATE A DYNAMIC RANGE IMAGE

(75) Inventor: Chikako Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 749 days.

(21) Appl. No.: 10/398,043

(22) PCT Filed: Jul. 29, 2002

(86) PCT No.: PCT/JP02/07682

§ 371 (c)(1),
(2), (4) Date: Mar. 31, 2003

(87) PCT Pub. No.: WO03/013129

PCT Pub. Date: Feb. 13, 2003

(65) Prior Publication Data

US 2004/0004666 A1    Jan. 8, 2004

(30) Foreign Application Priority Data

Aug. 1, 2001    (JP)    ............................. 2001-234038

(51) Int. Cl.
  *H04N 5/235*    (2006.01)
  *H04N 5/228*    (2006.01)
  *H04N 5/202*    (2006.01)
(52) U.S. Cl. .................................. 348/254; 348/222.1
(58) Field of Classification Search ................. 348/362, 348/254
See application file for complete search history.

(56) References Cited

U.S. PATENT DOCUMENTS

| | | | | |
|---|---|---|---|---|
| 5,144,442 A | * | 9/1992 | Ginosar et al. | .......... 348/222.1 |
| 6,111,980 A | * | 8/2000 | Sano et al. | ................. 382/167 |
| 6,184,940 B1 | * | 2/2001 | Sano | .......................... 348/655 |
| 6,219,097 B1 | * | 4/2001 | Kamishima et al. | ........ 348/297 |

(Continued)

FOREIGN PATENT DOCUMENTS

JP    10-261078    9/1998

(Continued)

*Primary Examiner*—Lin Ye
*Assistant Examiner*—Richard M Bemben
(74) *Attorney, Agent, or Firm*—Frommer Lawrence & Haug LLP; William S. Frommer; Paul A. Levy

(57) ABSTRACT

The present invention is directed to a digital still camera (1) using CCD (Charge Coupled Device) image sensor as image pick-up device. This camera (1) comprises an image memory (18) in which plural images obtained by picking up images of the same object by different exposure values are stored, an image data adding circuit (17) for synthesizing the plural images stored in the image memory (18) to generate synthetic image in which dynamic range is broad, a Y gradation correction circuit (24) and a multiplier circuit (26) for compressing gradation of the synthetic image generated by the image data adding circuit (17), and a controller (29) for generating gradation conversion table for carrying out gradation compression. The controller (29) generates gradation conversion table on the basis of synthetic curve in which line determined on the basis of ratio between the number of gradations of synthetic image and the number of gradations of output image and histogram indicating luminance distribution of synthetic image are synthesized.

6 Claims, 7 Drawing Sheets

U.S. PATENT DOCUMENTS 6,593,970 B1 * 7/2003 Serizawa et al. ........... 348/362
6,825,884 B1 * 11/2004 Horiuchi .................... 348/362

FOREIGN PATENT DOCUMENTS

| JP | 2000-156871 | 6/2000 |
| JP | 2001-8216 | 1/2001 |
| JP | 2002-135648 | 5/2002 |
| JP | 2002-290707 | 10/2002 |

* cited by examiner

IMAGE PICK-UP APPARATUS AND METHOD FOR PICKING UP AND SYNTHESIZING PLURAL IMAGES TO GENERATE A DYNAMIC RANGE IMAGE

TECHNICAL FIELD

The present invention relates to an image pick-up apparatus and an image pick-up method adapted for picking up images of the same object plural times by different exposure values to synthesize the plural images obtained by image pick-up to generate image in which the dynamic range is broad.

BACKGROUND ART

In the digital still camera, CCD (Charge Coupled Device) image sensor is generally used as image pick-up device. In the CCD image sensor, the dynamic range of photographable luminance area is very narrow as compared to silver photographic film. In order to compensate for narrowness of the dynamic range of this CCD image sensor, there have been conventionally proposed digital still cameras having such a function to pick up images of the same object plural times by different exposure values to additively synthesize the plural images different in exposure value which have been obtained by image pick-up to generate image having broad dynamic range.

In the case where plural images are additively synthesized in order to ensure the dynamic range in this way, the number of gradations of image after synthesis becomes great. For example, if the number of gradations of ordinary image data obtained from the CCD image sensor is assumed to be 8 bits, when four images different in exposure value are additively synthesized, the number of gradations of the image after additive synthesis becomes 10 bits. However, the numbers of gradations of format of media for recording picked up images obtained by the digital still camera, format of display for displaying picked up images and/or format of interface for outputting picked up images are determined in advance. For this reason, in such digital still cameras, it was necessary to compress the number of gradations of synthesized image to carry out conversion into the number of gradations adapted to these formats.

In the case where the number of gradations is compressed, if such compression is simply linearly carried out, it is sufficient to carry out, e.g., such a processing to truncate (round down) low order bits of respective pixels of synthetic image. For example, in the case where there is a need to compress image having the number of gradations of 10 bits into image having the number of gradations of 8 bits, it is sufficient to truncate (round down) low order 2 bits of 10 bits. However, when image obtained by synthesizing plural images is linearly gradation-compressed in this way, there are instances where the contrast becomes vague so that there results image difficult to see when displayed. In the case where gradation compression is carried out with respect to such image in which image synthesis is carried out so that the dynamic range has been broadened, it is general that correction of luminance level is also carried out at the same time so that there results image easy to see in which the contrast is clear.

As a technology for carrying out correction of luminance level along with gradation compression, gradation compression technique utilizing histogram averaging method is conventionally known.

Explanation will be given below in connection with the basic algorithm of gradation compression utilizing this histogram averaging method.

First, histogram indicating frequency distribution with respect to all luminance values is detected with respect to input image (image before conversion).

Subsequently, those frequencies are accumulated in order from lower luminance value to higher luminance value on the basis of the detected histogram to generate cumulative (accumulated) histogram. This cumulative histogram can be represented as a graph in which luminance level of input image (image before conversion) is taken on the abscissa and frequency is taken on the ordinate.

Subsequently, the ordinate of the cumulative histogram is replaced by luminance value of output image to generate correction curve. At this time, the maximum cumulative frequency of the cumulative histogram, i.e., value corresponding to the number of pixels of input image is caused to correspond to the maximum value (Ymax) of the number of gradations of output image (image after conversion), and the minimum cumulative frequency of the cumulative histogram, i.e., "0" is caused to correspond to the minimum value (Ymin) of the number of gradations of output image. For example, if the number of gradations of output image is 8 bits, there is generated correction curve in which the maximum cumulative frequency of the cumulative histogram is caused to correspond to luminance value of "255" and the minimum cumulative frequency of the cumulative histogram is caused to correspond to luminance value of "0".

The correction curve prepared in this way is stored into memory as conversion table.

In carrying out actual gradation compression processing, luminance value of output image with respect to luminance value of inputted image is detected while making reference to this conversion table to carry out conversion of the number of gradations.

The histogram is prepared in this way to carry out conversion of luminance value, whereby distribution of luminance at the entirety of image of output image is equalized so that there results image in which the contrast has been emphasized. For this reason, in the above-mentioned gradation compression technique utilizing the histogram averaging method, it is possible to convert input image of higher number of gradations into output image of lower number of gradations while correcting the image characteristic such as contrast, etc.

Even in the case where such gradation compression technique utilizing the histogram averaging method is used, there are instances where correction of luminance value is not carried out in an optimum manner so that image which has been caused to undergo conversion results in image difficult to see.

For example, in the case where image having peak characteristic at frequency of luminance is inputted, luminance of the same level existing in the vicinity of peak is dispersed over broad range in the method utilizing the histogram averaging method. In such a case, pixels having luminance levels close to each other are converted into pixels having large luminance difference so that output image becomes very difficult to see. In addition, for example, in the case where image having small luminance difference is inputted, correction is made in such a manner that its luminance difference is dispersed in the entire gradation area in the method utilizing the histogram averaging method. In such a case, output image becomes too bright on the whole so that there results image apparently unnatural.

DISCLOSURE OF THE INVENTION

The present invention has been proposed in view of actual circumstances as described above, and is adapted to pick up images of the same object by different exposure values to synthesize those images to thereby generate synthetic image in which the dynamic range is broad to compress the number of gradations of the generated synthetic image to carry out conversion into ordinary number of gradations.

An object of the present invention is to provide an image pick-up apparatus and an image pick-up method which can carry out correction so as to obtain natural output image in the state where there does not result image difficult to see by excessive correction of luminance value in the gradation conversion.

An image pick-up apparatus according to the present invention comprises: image pick-up means for picking up images of the same object plural times under different exposure conditions to generate images corresponding to plural pictures different in exposure value; image synthesis means for synthesizing the images corresponding to the plural pictures to generate one synthetic image in which luminance values of respective pixels are represented by a first number of gradations; histogram detecting means for detecting histogram indicating frequency distribution of luminance values of the synthetic image; and number of gradations converting means for converting the number of gradations of the synthetic image into a second number of gradations to generate an output image in which luminance values of respective pixels are represented by the second number of gradations. The number of gradations converting means converts luminance values of respective pixels represented by the first number of gradations into luminance values represented by the second number of gradations by conversion rule set on the basis of synthetic function in which linear function determined on the basis of ratio between the first number of gradations and the second number of gradations and histogram function having a characteristic corresponding to histogram are synthesized.

An image pick-up method according to the present invention comprises: picking up images of the same object plural times under different exposure conditions to generate images corresponding to plural pictures different in exposure value; synthesizing the images corresponding to the plural pictures to generate one synthetic image in which luminance values of respective pixels are represented by a first number of gradations; detecting histogram indicating frequency distribution of luminance values of the synthetic image; and converting, by conversion rule set on the basis of synthetic function in which linear function determined on the basis of ratio between the first number of gradations and a second number of gradations and histogram function having a characteristic corresponding to the histogram are synthesized, luminance values of respective pixels represented by the first number of gradations into luminance values represented by the second number of gradations to generate an output image in which luminance values of respective pixels are represented by the second number of gradations.

The image pick-up apparatus and the image pick-up method according to the present invention convert, by conversion rule set on the basis of synthetic function in which linear function determined on the basis of ratio between first number of gradations and second number of gradations and histogram function having characteristic corresponding to histogram indicating luminance distribution of input image are synthesized, luminance values of respective pixels represented by the first number of gradations into luminance values represented by the second number of gradations.

Still further objects of the present invention and practical merits obtained by the present invention will become more apparent from the description of the embodiments which will be given below with reference to the attached drawings.

BEST MODE FOR CARRYING OUT THE INVENTION

Explanation will now be given by taking the example where the present invention is applied to a digital still camera.

The digital still camera which will be explained below is a camera adapted for picking up images of the same object plural times by different exposure values to additively synthesize plural images different in exposure value which have been obtained by image pick-up to generate an image in which the dynamic range is broad to further reduce the number of gradations of that image in which the dynamic range is broad into the number of gradations adapted to ordinary output format to output an image.

Figure 1:
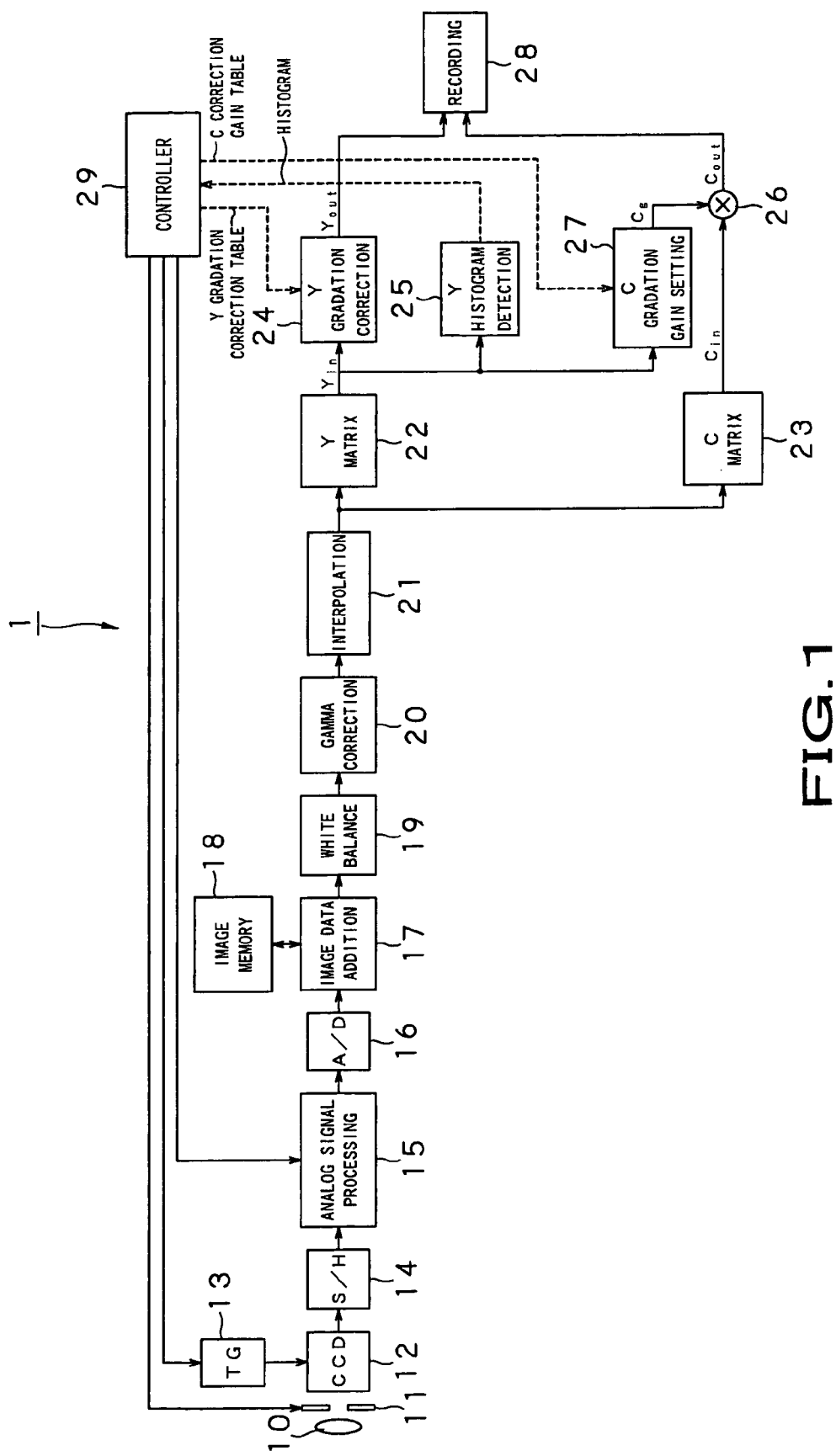
FIG. 1 is a block diagram showing a digital still camera to which the present invention is applied.

A block diagram of the digital still camera to which the present invention is applied is shown in FIG. 1.

As shown in FIG. 1, the digital still camera 1 is caused to be of the configuration comprising a lens 10, an iris (stop) shutter mechanism 11, a CCD 12, a timing generator (TG) 13, a S/H circuit 14, an analog signal processing circuit 15, an analog/digital (A/D) converter 16, an image data adding circuit 17, an image memory 18, a white balance circuit 19, a gamma correction circuit 20, an interpolation circuit 21, a Y matrix circuit 22, a C matrix circuit 23, a Y gradation correction circuit 24, a Y histogram detecting circuit 25, a multiplier circuit 26, a C gradation gain setting circuit 27, a recording circuit 28, and a controller 29.

The lens 10 is an optical element for forming image of light from object onto the CCD 12. The iris shutter mechanism 11 is a mechanism for controlling exposure value and/or irradiation time of light irradiated onto the CCD 12. The CCD 12 carries out photoelectric conversion of the irradiated object image to output an electric signal. The timing generator 13 generates charge transfer timing, readout timing and/or shutter timing, etc. of the CCD 12. A signal outputted from the CCD 12 is delivered to the S/H circuit 14.

The S/H circuit 14 implements correlative doble sampling processing to the input signal to generate an analog image signal. The analog image signal outputted from the S/H circuit 14 is delivered to the analog signal processing circuit 15. The analog signal processing circuit 15 amplifies the analog image signal so that it has a predetermined level to carry out various analog signal processing such as white/black balance adjustment, etc. The analog image signal outputted from the analog signal processing circuit 15 is delivered to the A/D converter 16. The A/D converter 16 converts the analog image signal into a digital image signal. The digital image signal outputted from the A/D converter 16 is delivered to the image data adding circuit 17.

The image data adding circuit 17 stores plural images of the same object which have been imaged by different exposure values into the memory 18 to additively synthesize these images to generate synthetic image data. Here, the number of gradations of the synthetic image data results in the number of gradations obtained by multiplying the number of gradations of original image before synthesis by the number of synthesized images. For example, if four original images in which the number of gradations is 8 bits (256 gradations) are additively synthesized, the number of gradations of synthetic image data becomes equal to 10 bits (256×4 gradations). The synthetic image data generated by the image data adding circuit 17 is delivered to the white balance circuit 19.

The white balance circuit 19 carries out white balance processing with respect to the synthetic image data. The synthetic image data outputted from the white balance circuit 19 is delivered to the gamma correction circuit 20. The gamma correction circuit 20 carries out gamma correction with respect to the synthetic image data. The synthetic image data outputted from the gamma correction circuit 20 is delivered to the interpolation circuit 21. The interpolation circuit 21 carries out color interpolation processing with respect to synthetic image data constituted with complementary colors to convert it into image data consisting of R, G, B components. The synthetic image data consisting of R, G, B components is delivered to the Y matrix circuit 22 and the C matrix circuit 23.

The Y matrix circuit 22 carries out matrix operation with respect to the synthetic image data consisting of R, G, B components to extract luminance (Y) component of the synthetic image. The extracted luminance data is delivered to the Y gradation correction circuit 24, the Y histogram detecting circuit 25 and the C gradation gain setting circuit 27. The C matrix circuit 23 carries out matrix operation with respect to the synthetic image data consisting of R, G, B components to extract color difference (Cr/Cb) component of the synthetic image. The extracted color difference data is delivered to the multiplier circuit 26.

The Y gradation correction circuit 24 has Y gradation correction table therein, and serves to convert value of inputted luminance data (Yin) into a predetermined value by making reference to this Y gradation correction table. In the Y gradation correction table, there are indicated luminance values represented in bit units of output luminance data (Yout) in correspondence with luminance values represented in units of the number of bits of input luminance data (Yin). The Y gradation correction circuit 24 converts the number of gradations of inputted luminance value in accordance with the correspondence relationship described in this Y gradation correction table. The Y gradation correction circuit 24 compresses, e.g., input luminance data (Yin) of the number of gradations of 10 bits into output luminance data (Yout) of the number of gradations of 8 bits. Accordingly, the number of gradations of luminance data is compressed into a predetermined number of gradations by the Y gradation correction circuit 24, and correction of luminance level is carried out in accordance with the characteristic described in the Y gradation correction table in company therewith. It is to be noted that while the Y gradation correction table is set by the controller 29, the detail of setting content thereof will be described later. The luminance data (Yout) in which the number of gradations has been compressed by the Y gradation correction circuit 24 is delivered to the recording circuit 28.

The Y histogram detecting circuit 25 is supplied with luminance data corresponding to one picture of synthetic image from the Y matrix circuit 22 to detect histogram indicating frequencies of occurrence of respective luminance values within one picture of synthetic image on the basis of inputted luminance data. For example, this histogram retrieves, e.g., inputted entire luminance data within synthetic image corresponding to one picture to classify entire luminance data obtained by retrieval every the same luminance or luminance of a predetermined range to calculate the number of pixels every such classification. Further, there is prepared a group of data in which calculated numbers of pixels are enumerated (arranged) in order from lower luminance value. This results in histogram. Accordingly, histogram can be represented as a graph in which luminance value (or a predetermined luminance range) is taken on the abscissa and frequency of occurrence within corresponding picture is taken on the ordinate. The histogram generated by the Y histogram detecting circuit 25 is delivered to the controller 29, and is utilized for generation of Y gradation correction table and generation of C correction gain table.

The multiplier circuit 26 multiplies color difference data (Cin) delivered from the C matrix circuit 23 by correction gain (Cg) delivered from the C gradation gain setting circuit 27 to convert the number of gradations of inputted color difference data, and correction of color difference level corresponding to the characteristic of inputted correction gain is carried out. For example, the multiplier circuit 26 converts input color difference data (Cin) of the number of gradations of 10 bits into output color difference data (Cout) of the number of gradations of 8 bits. The color difference data (Cout) in which the number of gradations has been compressed by the multiplier circuit 26 is delivered to the recording circuit 28.

The C gradation gain setting circuit 27 has C correction gain table therein, and serves to output correction gain (Cg) corresponding to value of inputted luminance data (Yin) by making reference to this C correction gain table. In the C correction gain table, there is indicated correction gain (Cg) in correspondence with luminance value represented in units of the number of bits of input luminance data (Yin). The C gradation gain setting circuit 27 outputs correction gain (Cg) in accordance with the correspondence relationship described in this C correction gain table. In this digital still camera 1, level correction is carried out together with gradation compression of luminance value. In the case where luminance value is corrected, unless color difference value is also similarly corrected, color to be outputted is disturbed. For this reason, in this digital still camera 1, correction quantity (correction gain (Cg)) of color difference data caused to correspond to inputted luminance value is generated to multiply color difference data (Cin)) outputted from the C matrix circuit 23 by this correction quantity.

Furthermore, this correction gain (Cg) is multiplied to thereby also compress the number of gradations of color difference data. It is to be noted that while the C correction gain table is set by the controller 29, the detail of the setting content thereof will be described later.

The recording circuit 28 is supplied with luminance data and color difference data in which gradation compression has been made to record these data with respect to the internal recording medium.

The controller 29 carries out various controls such as control of iris (stop) quantity and/or shutter speed for picking up images of the same object plural times by different exposure values, control of taking-in of image data, etc., generation control for synthetic image data, generation of Y gradation correction table to be stored into the Y gradation correction circuit 24, and generation of C correction gain table to be stored into the C gradation gain setting circuit 27, etc.

The digital still camera 1 having configuration as stated above has photographic (imaging) mode of high dynamic range for picking up images of the same object plural times by different exposure values. When the operation mode enters this high dynamic range mode, the digital still camera 1 carries out operation as described below.

First, the controller 29 controls the iris shutter mechanism 11 to pick up plural images of the same object while changing iris (stop) stepwise. As a result, plural image data different in exposure value with respect to the same object are generated. Moreover, for example, the controller 29 may control the timing generator 13 to pick up plural images of the same object while changing the electronic shutter speed stepwise, or may control the analog signal processing circuit 15 to pick up plural images of the same object while changing gain stepwise. Even if shutter speed or gain is changed in this way, it is possible to generate plural image data different in exposure value with respect to the same object. The plural images thus picked up are once (temporarily) stored into the image memory 18.

The image data adding circuit 17 completes image pick-up of plural images thereafter to additively synthesize plural image data stored in the image memory 18 to generate synthetic image data. For example, four image data of the number of gradations of 8 bits are synthesized to generate synthetic image data of the number of gradations of 10 bits.

When the synthetic image data is generated, histogram of luminance value of this synthetic image data is subsequently detected by the Y histogram detecting circuit 25. The detected histogram is delivered to the controller 29. The controller 29 prepares Y gradation correction table and C correction gain table on the basis of the detected histogram. The Y gradation correction table prepared by the controller 29 is stored into the Y gradation correction circuit 24. In addition, the C correction gain table prepared by the controller 29 is stored into the C gradation gain setting circuit 27.

When respective tables have been stored, gradation compression processing of synthetic image data is subsequently started. Namely, the number of gradations of luminance data is compressed at the Y gradation correction circuit 24, and the number of gradations of color difference data is compressed by the multiplier circuit 26. For example, luminance data and color difference data of 10 bit gradation are converted into data of 8 bit gradation. Thus, synthetic image data is converted into data of the number of gradations corresponding to recording format. Further, the recording circuit 28 records luminance data and color difference data which have been caused to undergo gradation compression with respect to recording medium.

As stated above, in this digital still camera 1, it is possible to pick up images in which the dynamic range is broad.

Then, explanation will be given in connection with preparation algorithm of Y gradation correction table for carrying out gradation compression of luminance data.

Figure 2:
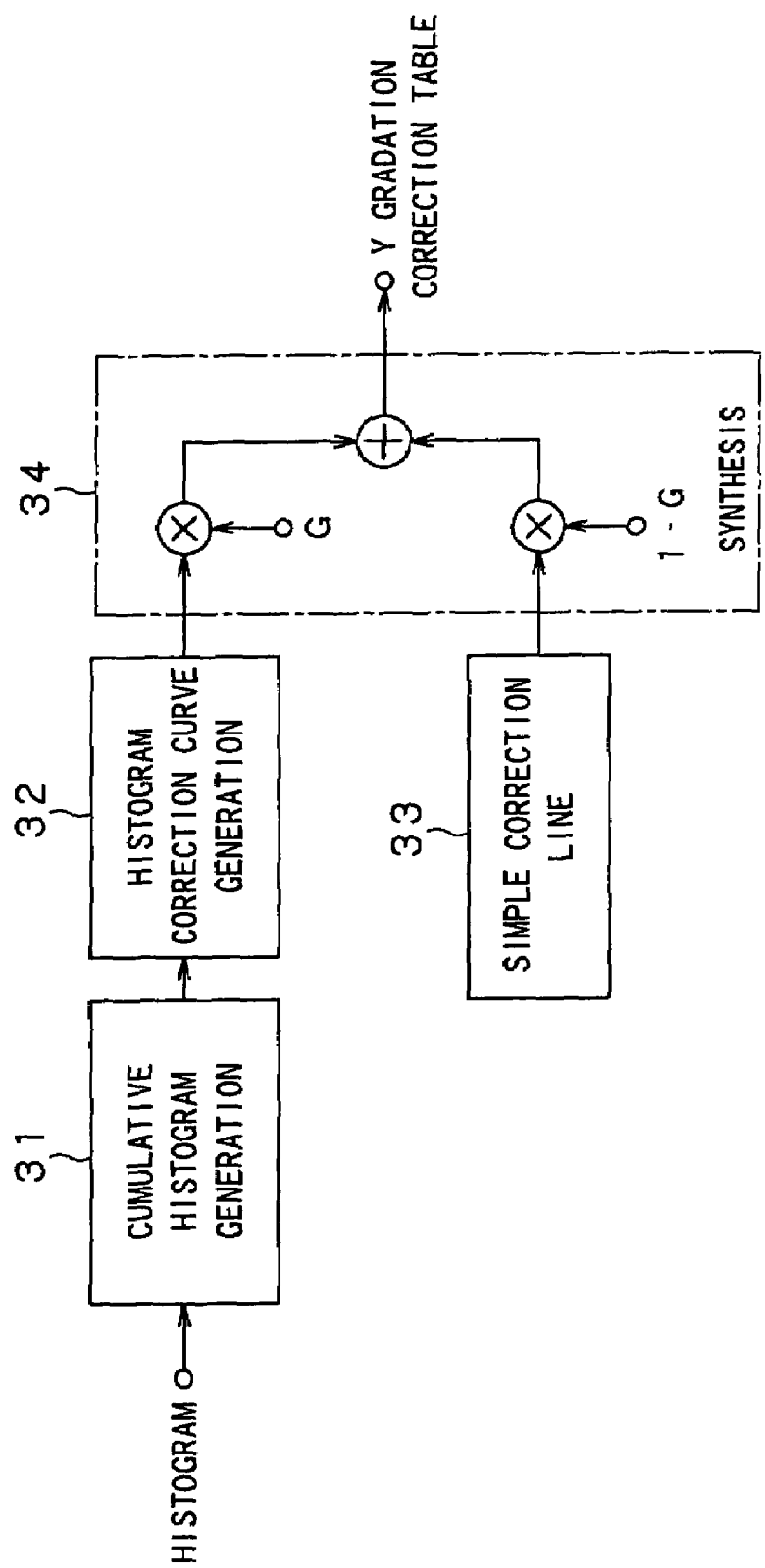
FIG. 2 is a block diagram for explaining preparation algorithm of Y gradation correction table.

A functional block for realizing preparation algorithm of Y gradation correction table is shown in FIG. 2.

As shown in FIG. 2, the functional block for realizing the preparation algorithm of the Y gradation correction table is composed of a cumulative histogram generating unit 31, a histogram correction curve generating unit 32, a simple correction line generating unit 33, and a synthesis unit 34.

Figure 3A:
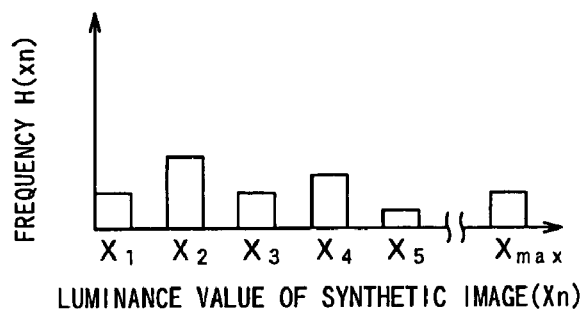
FIG. 3A is a view for explaining histogram.

Histogram of luminance of synthetic image is inputted from the Y histogram detecting circuit 25 to the cumulative histogram generating unit 31. In the case where the histogram is represented on a graph in which luminance value $X_n$ (n=1, 2, 3, . . . , max) is taken on the abscissa and frequency $H(X_n)$ of luminance is taken on the ordinate, the view as shown in FIG. 3A is provided.

Figure 3B:
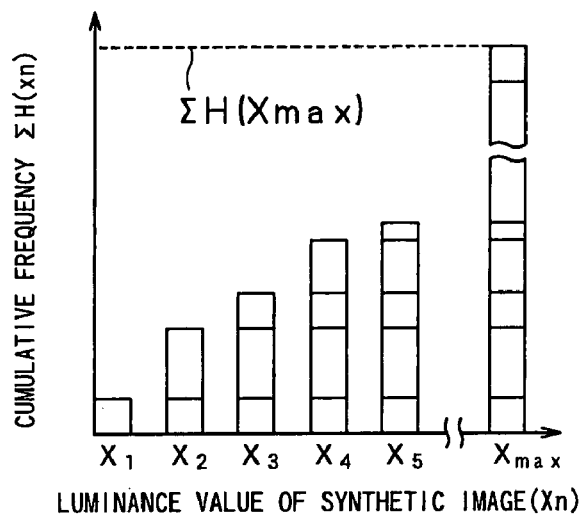
FIG. 3B is a view for explaining cumulative histogram.

The cumulative histogram generating unit 31 cumulatively adds, from lower luminance value ($X_1$) up to the highest luminance value ($X_{max}$), histograms as stated above which are delivered from the Y histogram detecting circuit 25 to generate cumulative histogram as shown in FIG. 3B. For example, if frequency of luminance $X_n$ is $H(X_n)$, cumulative frequency $\Sigma H(X_n)$ is as follows.

$\Sigma H(X_1) = H(X_1)$ $\Sigma H(X_2) = H(X_1) + H(X_2)$ $\Sigma H(X_3) = H(X_{01}) + H(X_2) + H(X_3)$

. . .

$\Sigma H(X_{max}) = H(X_1) + H(X_2) + H(X_3) + \ldots + H(X_{max})$

Figure 3C:
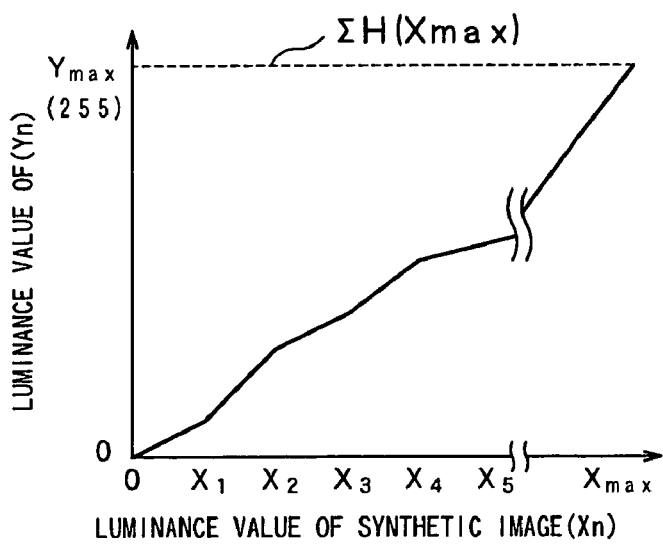
FIG. 3C is a view for explaining contrast correction curve.

Cumulative histogram generated by the cumulative histogram generating unit 31 is inputted to the histogram correction curve generating unit 32. As shown in FIG. 3C, the histogram correction curve generating unit 32 replaces ordinate $\Sigma H(X_n)$ of the cumulative histogram by luminance value ($Y_n$) of output image to generate histogram correction curve. At this time, in the histogram correction curve, setting is made such that the maximum cumulative frequency ($\Sigma H(X_{max})$) of the cumulative histogram is caused to correspond to the maximum value ($Y_{max}$) of the number of gradations of output image, and the minimum cumulative frequency of the cumulative histogram, i.e., 0 is caused to correspond to the minimum value ($Y_{min}$) of the number of gradations of output image. For example, if the number of gradations of output image is 8 bits, there is generated histogram correction curve in which the maximum cumulative frequency of the cumulative histogram is caused to correspond to luminance value of "255", and the minimum cumulative frequency of the cumulative histogram is caused to correspond to luminance value of "0".

It is to be noted that in the case where histogram correction curve is generated, value of $X_{max}$ may be maximum value of the number of gradations of synthetic image, or may be the maximum value of luminance data actually obtained. When value of $X_{max}$ is caused to be the maximum value of luminance data actually obtained, image where the dynamic range is broad utilizing the gradation range of output image at the maximum can be generated in the case of image in which signal component does not exist in the high luminance area.

Figure 4A:
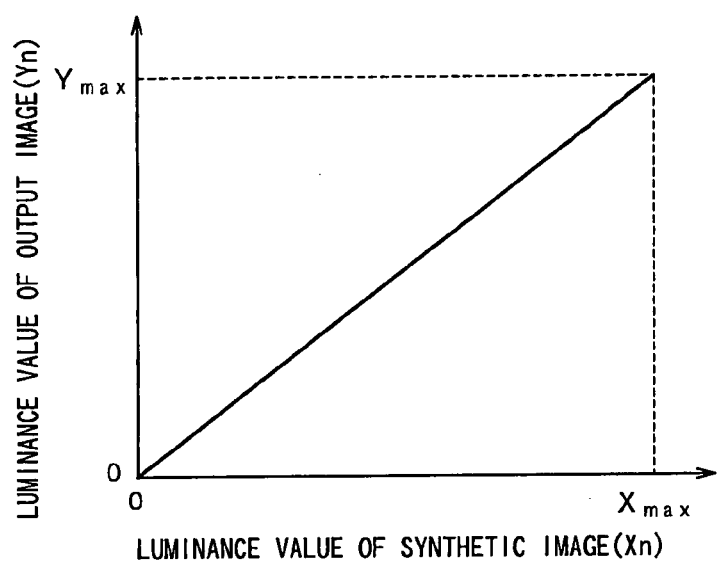
FIG. 4A is a view for explaining simple correction line.

The simple correction line generating unit 33 generates simple correction line. As shown in FIG. 4A, this simple correction line is line represented by $Y_n=(Y_{max}/X_{max})X_n$. $Y_{max}$ is the maximum value of the number of gradations of output image, and $X_{max}$ is the maximum value of the number of gradations of synthetic image (image before conversion). For example, if output image has 8 bit gradation, $Y_{max}$ becomes equal to 256. If synthetic image has 10 bit gradation, $X_{max}$ becomes equal to 1024. Thus, line of $Y_n=(¼) X_n$ is provided.

It is to be noted that, in the case of generating simple correction line, value of $X_{max}$ may be also the maximum value of luminance data actually obtained in place of setting that value to the maximum value of the number of gradations of synthetic image. Value of $X_{max}$ is caused to be the maximum value of luminance data actually obtained, thereby making it possible to generate image where dynamic range is broad utilizing the gradation range of output image at the maximum in the case of image in which signal component does not exist in the high luminance area.

Figure 4B:
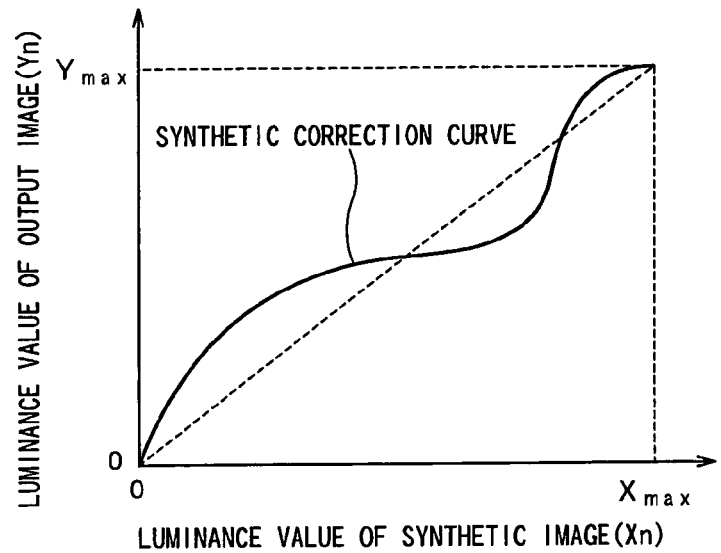
FIG. 4B is a view for explaining synthetic correction curve.

The synthesis unit 34 additively synthesizes histogram correction curve and simple correction line after undergone multiplication of predetermined synthetic ratios. For example, the synthetic ratio G is set within the range of 0~1. Histogram correction curve is multiplied by "G", and simple correction line is multiplied by complement (1−G) of this G. Thereafter, both are additively synthesized. When additive synthesis is carried out in this way, synthetic correction curve as shown in FIG. 4B can be generated. The synthesis unit 34 stores the generated synthetic correction curve into memory within the Y gradation correction circuit 24 as Y gradation correction table.

It is to be noted that synthetic ratio G between histogram correction curve and simple correction line is suitably changed, thereby making it possible to change correction ratio of luminance level. For example, in the case where the state of distribution of histograms, etc. is observed so that there is not so desire to carry out luminance correction, it is sufficient to increase ratio of simple correction line, while in the case where there is a desire to intensively carry out luminance correction, it is sufficient to increase ratio of histogram correction curve.

Then, the preparation algorithm of the C gradation gain correction table will be described.

Figure 5:
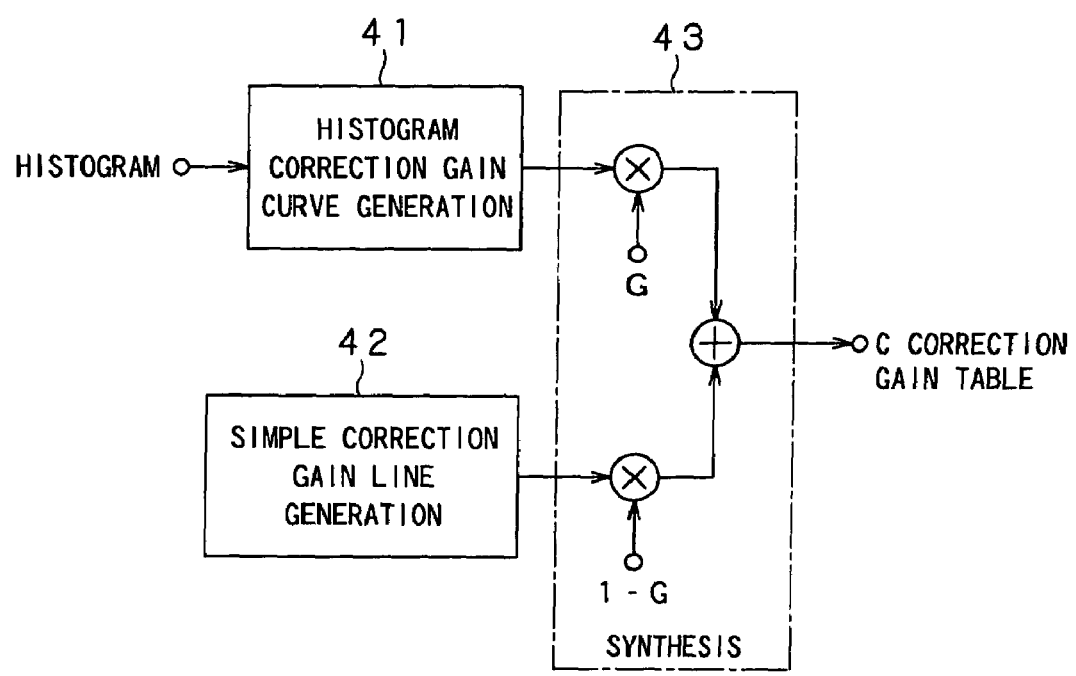
FIG. 5 is a block diagram for explaining preparation algorithm of C gain correction table.

A functional block for realizing the preparation algorithm of the C gradation gain correction table is shown in FIG. 5.

As shown in FIG. 5, the functional block for realizing the preparation algorithm of the C gradation gain correction table is composed of a histogram gain correction curve generating unit 41, a simple correction gain line generating unit 42, and a synthesis unit 43.

Figure 6A:
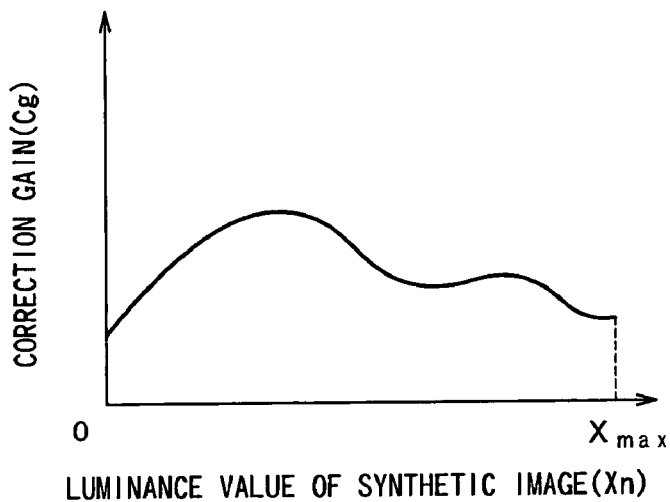
FIG. 6A is a view for explaining contrast correction gain curve.

The histogram gain correction generating unit 41 is supplied with histogram of luminance of synthetic image from the Y histogram detecting circuit 25 to generate histogram correction gain curve on the basis of this histogram. As shown in FIG. 6A, this histogram correction gain curve is a curve indicating value of correction gain Cg with respect to luminance value of inputted synthetic image. Namely, this histogram correction gain curve is a curve indicating correction ratio of color difference data in the case where luminance value is corrected on the basis of histogram.

Figure 6B:
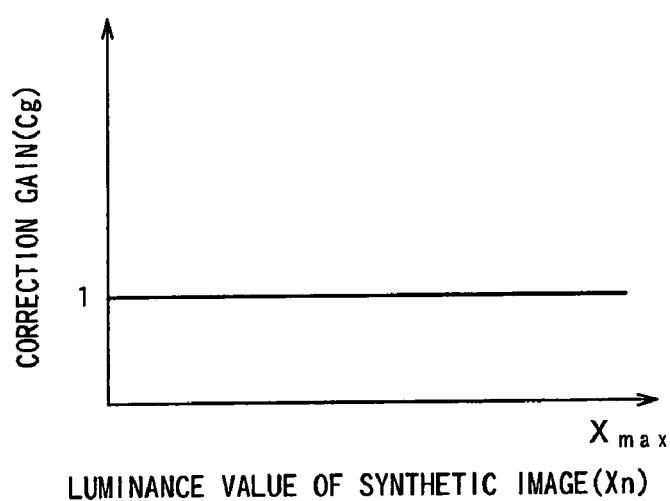
FIG. 6B is a view for explaining simple correction gain line.

The simple correction gain line generating unit 42 generates simple correction gain line. This simple correction gain line indicates correction quantity of color difference data in the case where luminance value is not corrected. Namely, if luminance value is not corrected, it is sufficient that color difference data is not corrected. For this reason, as shown in FIG. 6B, correction gain Cg generated by this simple correction gain line generating unit 42 becomes equal to value of "1" at all times irrespective of luminance value of synthetic image.

Figure 6C:
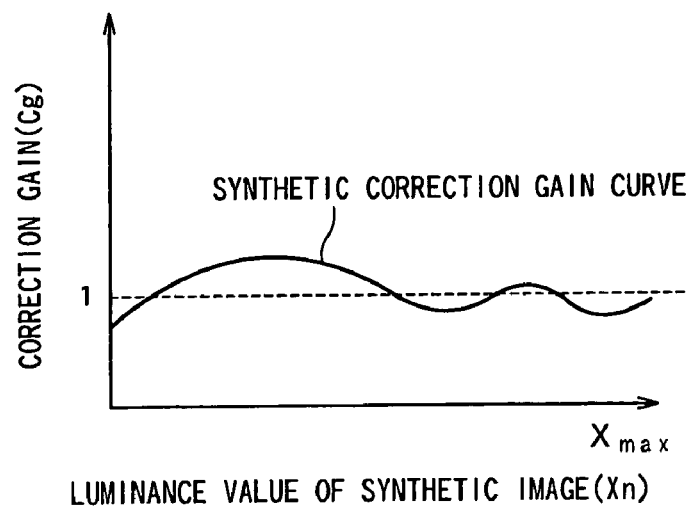
FIG. 6C is a view for explaining synthetic correction gain curve.

The synthesis unit 43 multiplies histogram correction gain curve and simple correction gain line by predetermined synthetic ratios to carry out additive synthesis. For example, the synthetic ratio is set within the range of 0~1 and histogram correction gain curve is multiplied by "G". Simple correction gain line is multiplied by complement (1−G) of this G. Thereafter, both are additively synthesized. When additive synthesis is carried out in this way, synthetic correction gain curve as shown in FIG. 6C can be generated. The synthesis unit 43 stores the generated synthetic correction gain curve into memory within the C gradation gain setting circuit 27 as C correction gain table.

In the digital still camera 1 to which the present invention is applied, color difference data is multiplied by correction gain Cg obtained on the basis of synthetic correction gain curve as stated above, whereby correction of color difference value is carried out. Further, low order bits of this corrected color difference data is truncated (rounded down), whereby gradation conversion is carried out.

As stated above, in the digital still camera 1 to which the present invention is applied, gradation conversion is carried out by correction curve in which simple correction line which simply carries out linear conversion of the number of gradations and histogram correction curve which makes correction so that luminance values are averaged on the basis of histogram.

When gradation conversion is carried out by such correction curve, even in the case where image having peak characteristic at frequency of luminance or image having less luminance difference is inputted, it can be prevented that there results image apparently unnatural.

Figure 7:
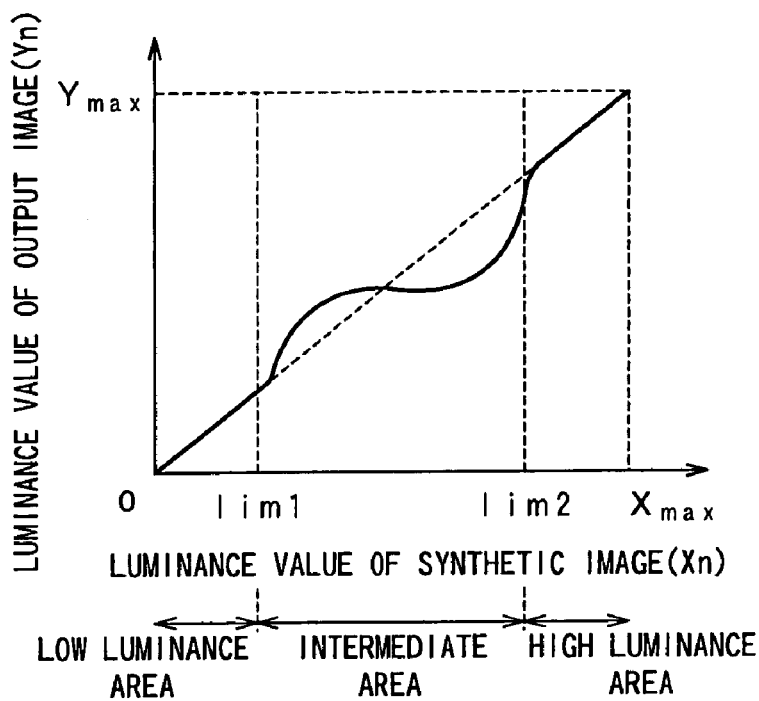
FIG. 7 is a view for explaining a modified example of Y gradation correction table.

It is to be noted that the example where synthetic ratio G between histogram correction curve and simple correction line is caused to be uniform with respect to all luminance levels is shown in the above-described explanation, there may be employed, as shown in FIG. 7, an approach to set limit values (lim1, lim2) in the low luminance area or the high luminance area, or in both areas to respectively vary synthetic ratio G in the low luminance area, in the intermediate area and in the high luminance area. For example, when line ratios of the low luminance area and the high luminance area are both set to "1" (Namely, ratio of the histogram correction curve is zero (0)), averaging processing by histogram is not carried out in these areas. As a result, it is possible to suppress that, e.g., black floats on the whole so that there results loose image.

Figure 8:
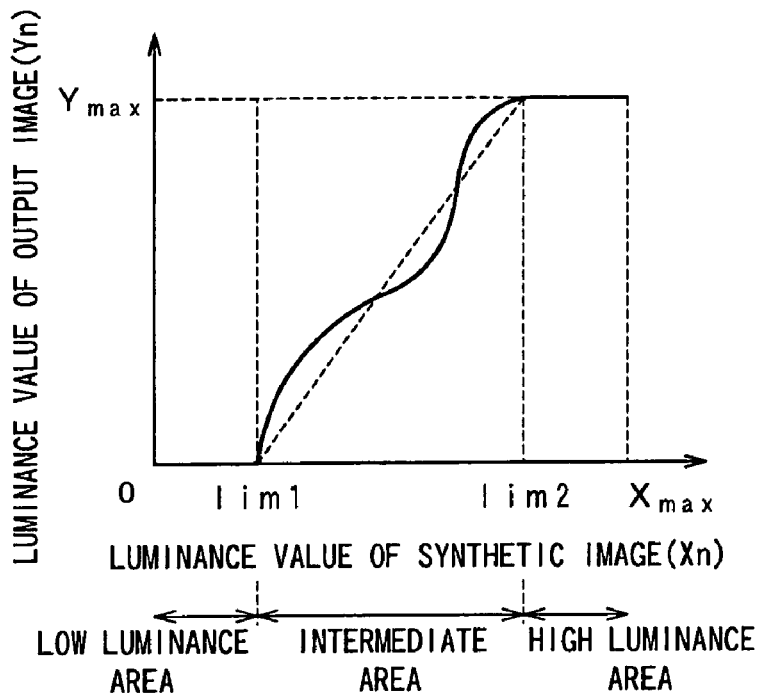
FIG. 8 is a view for explaining another modified example of Y gradation correction table.

Moreover, as shown in FIG. 8, there may be employed a correction curve such that luminance values of output image are caused to be all zero (0) with respect to the low luminance area and luminance values of output image are caused to be all the maximum value with respect to the high luminance area. In this case, limit value may be set to the minimum value and the maximum value of input value, or may be set to predetermined ratios at upper and lower sides, e.g., 3 percents at upper and lower sides. By making setting in this way, it is possible to remove noises included in large quantities in the high luminance area and the low luminance area. It is to be noted that simple correction line in this instance is set in a manner as stated below.

$Xn < lim1 : Yn = 0$ $lim1 \leq Xn \leq lim2 : Yn = \{Y_{max}/(lim2 - lim1)\} Xn$ $Xn > lim2 : Yn = Y_{max}$ While the example where luminance levels of all pixels of synthetic image are detected in detecting histogram at the Y histogram detecting circuit 25 is shown in the above-described example, pixels partially extracted may be thinned in place of luminance levels of all pixels to detect luminance level. This is because if a certain luminance distribution characteristic of image can be obtained, correction curve can be generated. In addition, in the case where photographing is carried out for a second time under the same condition, if histograms which have been photographed in the past and/or gradation correction table, etc. are preserved to utilize those data for a second time, shortening of processing time can be realized.

INDUSTRIAL APPLICABILITY

The present invention is adapted to convert, by conversion rule set on the basis of synthetic function in which linear function determined on the basis of ratio between first number of gradations and second number of gradations and histogram function having characteristic corresponding to histogram indicating luminance distribution of input image are synthesized, luminance values of respective pixels represented by the first number of gradations into luminance values represented by the second number of gradations to thereby pick up images of the same object by different exposure values to synthesize those images to thereby generate synthetic image where dynamic range is broad to compress the number of gradations of the generated synthetic image to have ability to carry out conversion into ordinary number of gradations. In this instance, correction can be carried out in such a manner that natural output image can be obtained in the state where there does not result image difficult to see by excessive correction of luminance value.

The invention claimed is:

1. An image pick-up apparatus comprising:
image pick-up means for picking up images of the same object a plurality of times under different exposure conditions to generate images corresponding to a plurality of pictures with different exposure values;
image synthesis means for synthesizing the images corresponding to the plurality of pictures to generate one synthetic image in which luminance values of respective pixels are represented by a first number of gradations;
histogram detecting means for detecting a histogram indicating frequency distribution of luminance values of the synthetic image;
gradation number converting means for converting the number of gradations of the synthetic image into a second number of gradations to generate an output image in which luminance values of respective pixels are represented by the second number of gradations,
wherein according to a conversion rule based on a synthetic function, into which a linear function determined based on a ratio between the number of gradations of the synthetic image and the number of gradations of the output image and a histogram function having a characteristic corresponding to the histogram are synthesized, the gradation number converting means converts luminance values of respective pixels represented by the first number of gradations into luminance values represented by the second number of gradations; and
extracting means for extracting luminance components of the synthetic image and delivering the components to a gradation correction circuit,
wherein the gradation correction circuit converts the luminance components into a predetermined value based on the classification of the images for the synthetic image.

2. The image pick-up apparatus as set forth in claim 1,
wherein the gradation number converting means sets a lower limit value and an upper limit value higher than the lower limit value of the luminance value of the synthetic image, and
wherein the synthetic function is adapted so a portion below the lower limit value and/or a portion above the upper limit value are caused to be the linear function.

3. An image pick-up apparatus comprising:
image pick-up means for picking up images of the same object a plurality of times under different exposure conditions to generate images corresponding to a plurality of pictures with different exposure values;
image synthesis means for synthesizing the images corresponding to the plurality of pictures to generate one synthetic image in which luminance values of respective pixels are represented by a first number of gradations;
histogram detecting means for detecting a histogram indicating frequency distribution of luminance values of the synthetic image;
gradation number converting means for converting the number of gradations of the synthetic image into a second number of gradations to generate an output image in which luminance values of respective pixels are represented by the second number of gradations,
wherein the gradation number converting means sets a lower limit value and an upper limit value higher than the lower limit value of the luminance value of the synthetic image such that
when the luminance value of the synthetic image is below the lower limit value, the output value becomes equal to zero,
when the luminance value of the synthetic image is above the upper limit value, the output value becomes equal to the maximum value, and
when the luminance value of the synthetic image is in the range from the lower limit value to the upper limit value, the gradation number converting means converts, by conversion rule based on synthetic function, into which the linear function determined based on a ratio between a difference value between the upper limit value and the lower limit value and the second number of gradations and the histogram function are synthesized, the gradation number converting means converts luminance values of respective pixels represented by the first number of gradations into luminance values represented by the second number of gradations; and
extracting means for extracting luminance components of the synthetic image and delivering the components to a gradation correction circuit,
wherein the gradation correction circuit converts the luminance components into a predetermined value based on the classification of the images for the synthetic image.

4. An image pick-up method comprising:
picking up images of the same object a plurality of times under different exposure conditions to generate images corresponding to a plurality of pictures with different exposure values;
synthesizing the images corresponding to the plurality of pictures to generate one synthetic image in which luminance values of respective pixels are represented by a first number of gradations;

detecting histogram indicating a frequency distribution of luminance values of the synthetic image;

converting, by conversion rule based on a synthetic function into which a linear function determined based on a ratio between the number of gradations of the synthetic image and the number of gradations of the output image and a histogram function having a characteristic corresponding to the histogram are synthesized, luminance values of respective pixels represented by the first number of gradations into luminance values represented by the second number of gradations to generate an output image in which luminance values of respective pixels are represented by the second number of gradations;

extracting luminance components of the synthetic image and delivering the components to a gradation correction circuit; and converting the luminance components into a predetermined value based on the classification of the images for the synthetic image.

5. The image pick-up method as set forth in claim 4, wherein a lower limit value and an upper limit value are set at the luminance value of the synthetic image, and the synthetic function is adapted so a portion below the lower limit value and/or a portion above the upper limit value are caused to be the linear function.

6. An image pick-up method comprising:

picking up images of the same object a plurality of times under different exposure conditions to generate images corresponding to a plurality of pictures with different exposure values;

synthesizing the images corresponding to the plurality of pictures to generate one synthetic image in which luminance values of respective pixels are represented by a first number of gradations;

detecting histogram indicating a frequency distribution of luminance values of the synthetic image;

converting the number of gradations of the synthetic image into a second number of gradations to generate an output image in which luminance values of respective pixels are represented by the second number of gradations;

setting a lower limit value and an upper limit value at the luminance value of the synthetic image such that when the luminance value of the synthetic image is value below the lower limit value, the output value becomes equal to zero, when the luminance value of the synthetic image is above the upper limit value, the output value becomes equal to the maximum value, and when the luminance value of the synthetic image is in the range from the lower limit value to the upper limit value, the luminance values of respective pixels represented by the first number of gradations are converted into luminance values represented by the second number of gradations by conversion rule based on the synthetic function, into which linear function determined based on a ratio between a difference value between the upper limit value and the lower limit value and the second number of gradations and the histogram function are synthesized; and extracting luminance components of the synthetic image and delivering the components to a gradation correction circuit; and converting the luminance components into a predetermined value based on the classification of the images for the synthetic image.

* * * * *